Figure 5:
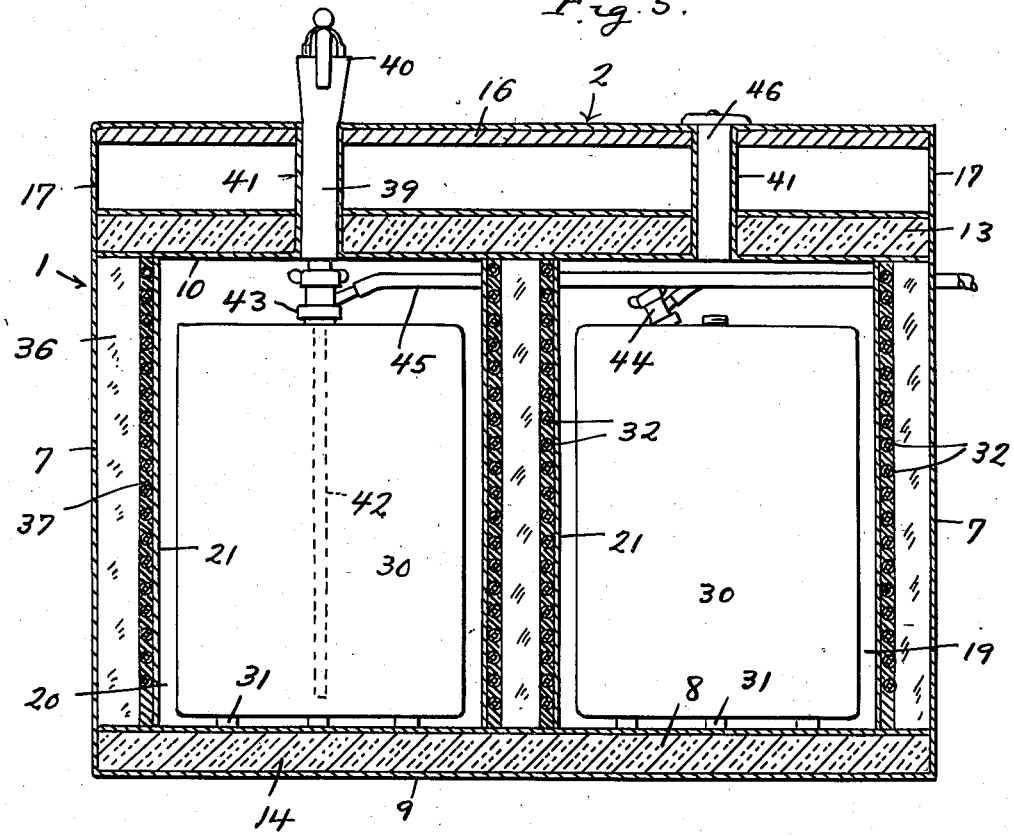

May 7, 1940.                R. C. AYERS                2,199,718
                            BEER COOLER
                       Filed May 15, 1939        3 Sheets-Sheet 1
Fig. 1.
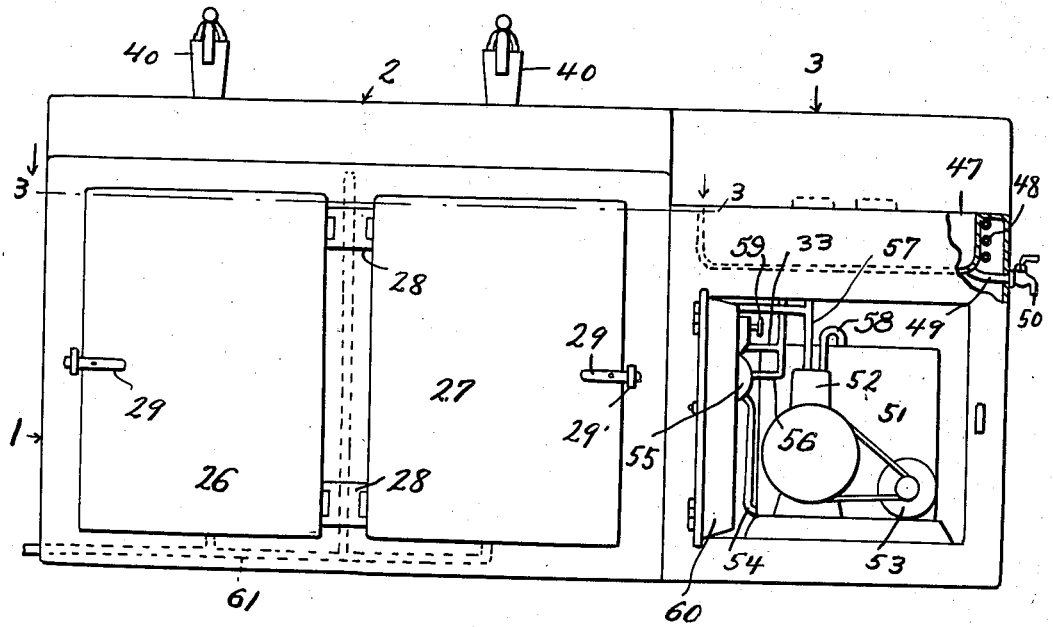
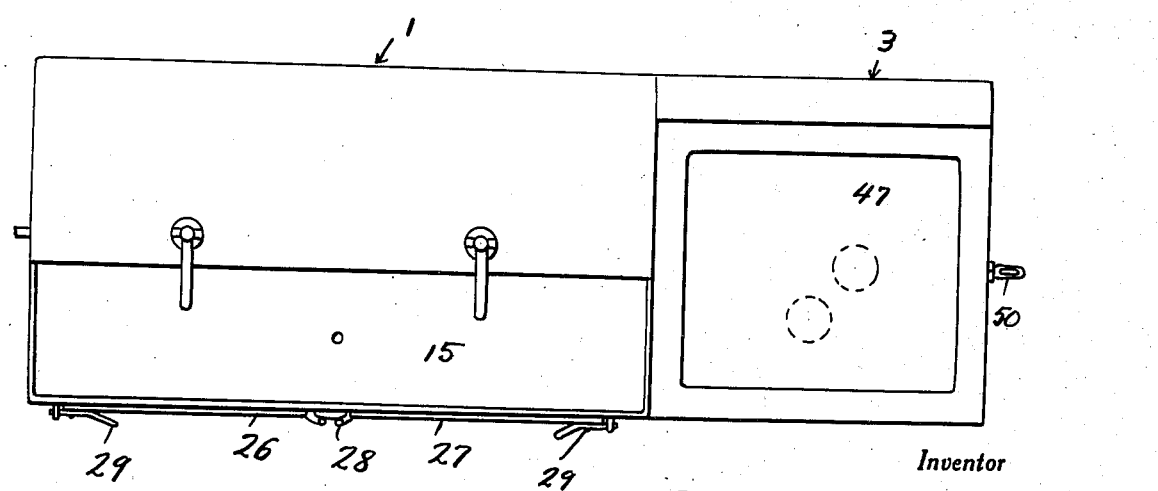
Fig. 2.
Inventor
Ray C. Ayers
By Clarence A. O'Brien
and Hyman Berman
                              Attorneys May 7, 1940.   R. C. AYERS   2,199,718
BEER COOLER
Filed May 15, 1939   3 Sheets-Sheet 2
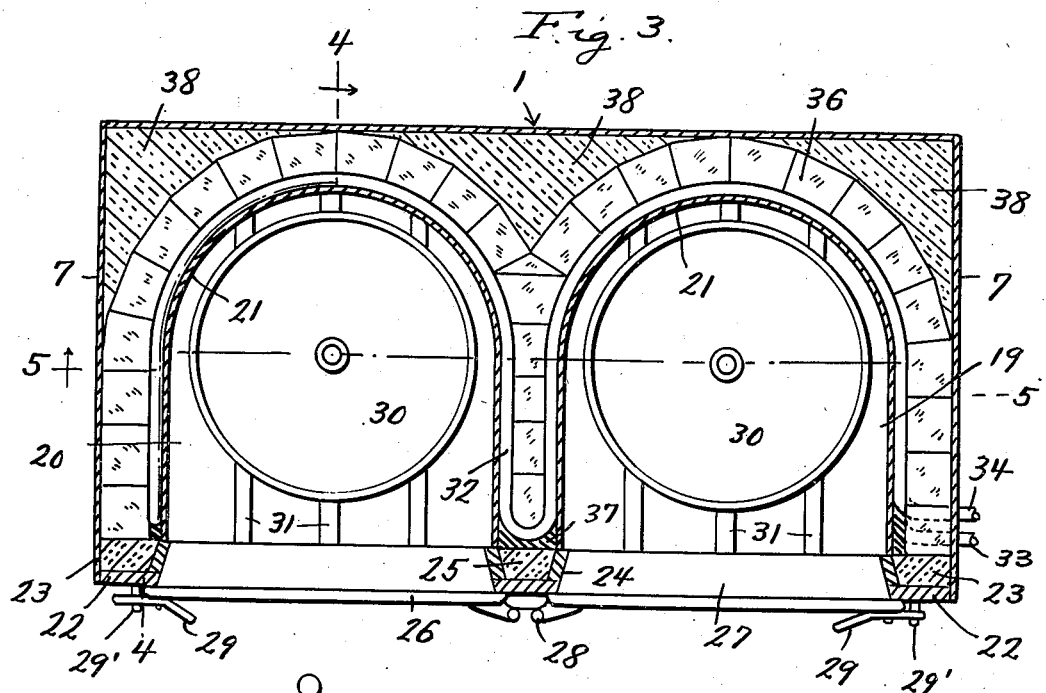
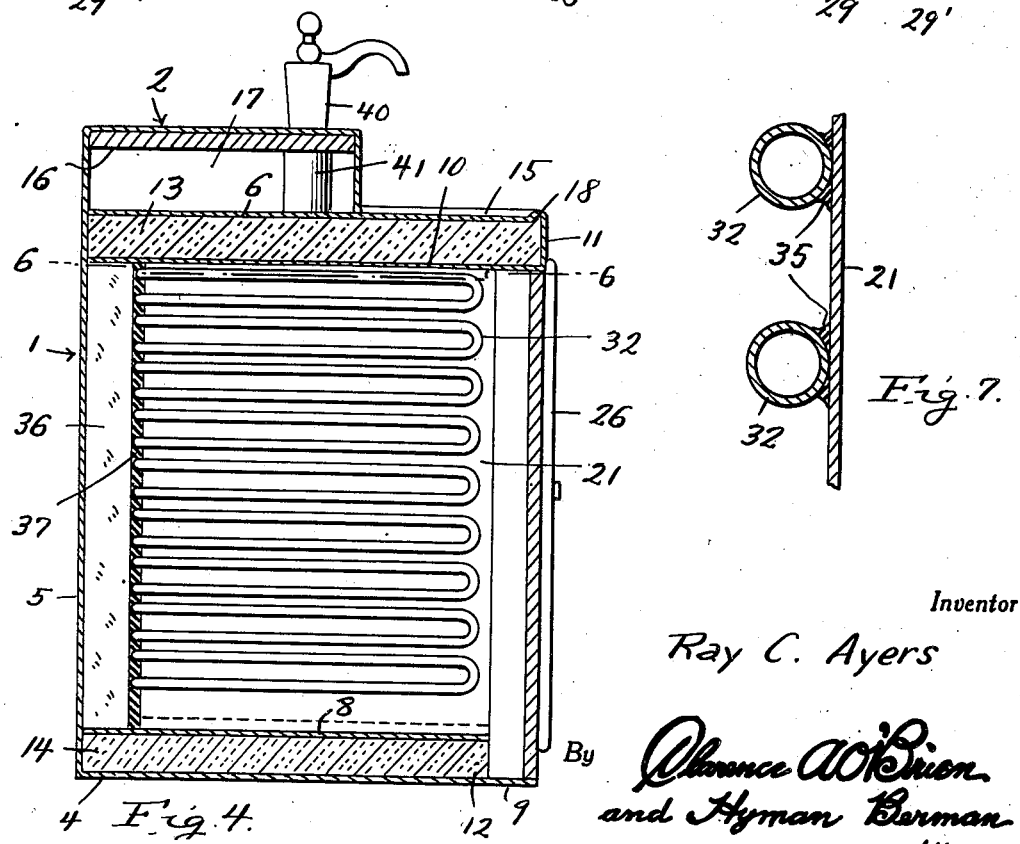
Inventor
Ray C. Ayers
By Clarence A. O'Brien
and Hyman Berman
Attorneys May 7, 1940.   R. C. AYERS   2,199,718
BEER COOLER
Filed May 15, 1939    3 Sheets-Sheet 3

Inventor
Ray C. Ayers
By Clarence A. O'Brien
and Hyman Berman
Attorneys

Patented May 7, 1940

2,199,718

UNITED STATES PATENT OFFICE 2,199,718

BEER COOLER

Ray C. Ayers, Hutchinson, Kans.

Application May 15, 1939, Serial No. 273,779

4 Claims. (Cl. 62—99)

My invention relates to improvements in beer coolers for cooling draught beer in the keg.

As is well known in the art, draught beer is kept at the brewers at temperatures ranging from thirty-four to forty-two degrees Fahrenheit and stored in shipment in refrigerator cars at a temperature within such a range of variations. It is important when the beer is delivered to the retailer, or dispenser, and tapped that this temperature range be maintained, thirty-eight degrees being the ideal temperature and for the following reasons:

At this, or approximately such temperature, the beer develops the proper beer-gas pressure, about eight pounds to a thirty-one gallon keg, to impart thereto when drawn the true beer flavor. In order to keep draught beer from going flat it is necessary to use carbon dioxide gas therein from twelve to fifteen pounds of pressure depending on the distance between the gas tank and keg. If the beer on draught is tapped at a higher temperature, for instance as commonly occurs fifty or sixty degrees, the natural beer-gas pressure rises. Under this condition, with carbon dioxide introduced therein at the necessary twelve to fifteen pounds of pressure, the natural beer gas is soon forced out of the beer to the top of the keg. The result is loss of true beer flavor and in fact flat beer. This condition also results in decreasing the number of glasses which can be drawn from a keg for reasons which will be understood.

Having the foregoing in mind, it is the principal object of my invention to provide a beer cooler for keg beer constructed and arranged to maintain all the beer in the keg at the proper temperature and the natural beer gas at the proper ratio under imposed pressure until the entire contents of the keg has been drawn.

Another object is to provide apparatus of the character and for the purpose set forth which is compact, simple in construction, adapted for quick-cooling action, and economical in operation and upkeep.

Another object is to provide individual cooling compartments for beer kegs, or other containers, constructed and arranged so that loading or unloading of either compartment is made easy and will not affect the temperature of the other nor damage the cooling system.

Still another object is to provide a beer cooler equipped for maintaining the drinking glasses in a sanitary and adequately cooled condition.

To the accomplishment of the foregoing and subordinate objects presently appearing, a preferred embodiment of my invention has been illustrated in the accompanying drawings, set forth in detail in the succeeding description, and defined in the claims appended hereto.

Figure 6:
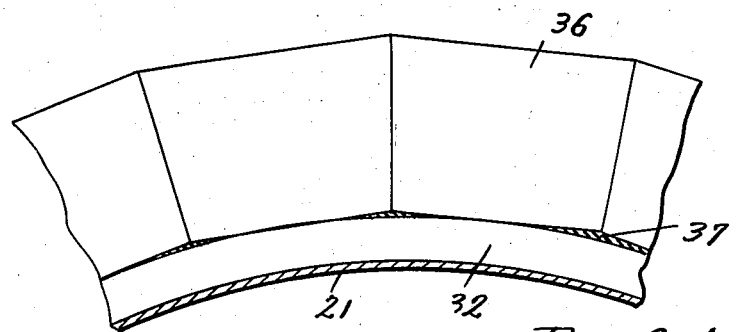

In said drawings:

Figure 1 is a view in front elevation of the preferred embodiment of my invention with the door of the cabinet section open, Figure 2 is a view in top plan, Figure 3 is a view in horizontal section taken on the line 3—3 of Figure 1 looking downwardly as indicated by the arrows and drawn to an enlarged scale with the cabinet section and parts therein eliminated, Figure 4 is a view in transverse vertical section taken on the line 4—4 of Figure 3 looking in the direction indicated by the arrows, Figure 5 is a view in vertical longitudinal section taken on the line 5—5 of Figure 3 looking in the direction of the arrows, Figure 6 is a fragmentary view in horizontal section taken on the line 6—6 of Figure 4, and Figure 7 is a detailed view in vertical section showing the manner in which the coil stretches are bonded to the shells.

Referring to the drawings by numerals, in the illustrated embodiment thereof the beer cooler of my invention comprises a rectangular cooling section 1, surmounted by a bar, or serving, section 2, and a cabinet section 3 at one end of said section 1 which may constitute an integral, or separate, part of section 1 as desired.

The cooling section 1 comprises a sheet metal box-like casing of elongated rectangular form and preferably of sheet steel and including outer bottom, front, top and end walls 4, 5, 6 and 7, respectively, said casing being open at the rear side thereof. Spaced at a suitable distance above the outer bottom wall 4 is an inner sheet steel bottom wall 8 extending to the end walls 7 and to the front wall 5 and rear edges of said end walls. Similarly spaced below the outer top wall 6 is an inner sheet steel top wall 10 extending to the end walls 7 and from the front wall 5 to the rear edges of said walls 7. As shown in Figure 4, the space between the rear edges of said top walls 6 and 10 is closed, as at 11, and that between the outer and inner bottom walls 4 and 8 as at 12. The space between the outer and inner top walls 6 and 10 is filled by a slab, or panel, 13 of cork insulation and that between the outer and inner bottom walls 4 and 8 by a similar slab or panel 14. The front wall 5 is extended upwardly above the top wall 6 then rearwardly over the same and then downwardly to said wall 6 to form a bar 2 surmounting substantially the front half of the top of the casing 1, the top wall 6 in the rear of the bar 2 being used as a drain ledge or shelf 15. The top of the bar 2 may be reinforced as by a suitable rigid panel 16 of wood insulation thereunder, and closed at its ends by extensions 17 of end walls 7. The top wall 6 may be beaded as at 18 around the edge of the ledge 15 to retain liquid thereon and drained in any suitable manner.

Within the section 1 are two cooling compartments 19 and 20 formed as follows: A pair of U-shaped steel shells 21 are fitted endwise between the walls 8 and 10 open side rearmost and upon opposite sides of the transverse center of said section in spaced-apart relation to each other and to the front wall 5 and end walls 7, and with the longitudinal rear edges thereof slightly spaced inwardly from the rear open side of the section for a purpose presently appearing. The space between the ends 7 of the casing of section 1 and the adjacent vertical rear edges of said shells 21 is bridged and sealed by door framing comprising an outer transversely angular vertically extending facing strip 22 of heavy metal and a suitable insulation filler backing said facing strip 22. The space between adjacent vertical rear edges of the shells is similarly bridged by a vertically extending box-like casing strip 24 and a filler of suitable insulation 25 in said strip. The strips 22, 24 form together with the closure parts 11, 12 doorways for the compartments 19, 20 adapted to be closed by a pair of heavy suitably insulated doors 26, 27 hinged to the strip 24, as at 28 and having latches 29 thereon engaging keepers 29' on the strips 22.

As will now be seen, the walls 8 and 10 form the bottom and top of said compartments 19, 20 and said compartments are each designed so that a beer keg 30 housed therein will fit in the same with only a slight clearance.

Transversely disposed cleats 31 are provided in each compartment 19, 20 on the wall 8 to facilitate loading the kegs 13 therein and to space said kegs above said wall for circulation of air under the same.

Fitting against the outer faces of said shells 21 is a cooling unit, or assembly, of vertically spaced coils 32 including horizontally extending stretches bent upon themselves to follow the contour of said shells and bridge the space between the same, said coils extending substantially to the edges of said shells and being preferably formed of a single length of tubing having intake and discharge ends 33, 34 terminating in the cabinet section 3.

The coils, or unit, 32 are bonded to the outer faces of the shells 21 in intimate contact therewith by solder 35. Surrounding the coils 32 is a layer of block cork insulation 36 following the contour of the shells 21 and fitting into the space between the straight stretches of said coils and the ends of the section 1. The blocks of insulation 36 are anchored together by a layer of asphalt or asphalt cement, 37 filling in between the stretches of the coils. The spaces between the cork insulation layer and the front and end walls 5 and 7 of section 1 are filled with suitable insulation 38 of a cementitious material.

Preferably for tapping the kegs 30 direct draw draught tubes are utilized, each including an enlarged tubular head 39 equipped with a tap 40 and extending downwardly through the bar section 2, the walls 6 and 10 and insulation slab 13, and by way of bushings 41 extending from the wall 10 to the top of section 2 and in which the heads 39 have a drive fit. The lower end 42 of each draught tube extends into the keg 30 in the usual manner to approximately the bottom thereof and is secured to the related head by a coupling 43. The kegs 30 are equipped with the usual connections 44 for lines 45 leading from the charging tank, not shown. The lines 45 may be introduced into the compartments 19, 20 in any suitable manner. When only one keg 30 is on tap the bushing 41 for the empty compartment may be closed by a close-fitting plug 46. The cabinet section 3 includes countersunk top portion forming a sink, or tank, 47 at the rear thereof for cooling glasses, said sink being surrounded within the cabinet section 3 by a cooling coil 48 and having a drain pipe 49 extending through one side of said section and equipped with a drain cock 50.

The cabinet section 3 houses beneath said sink 47 a suitable plant for a refrigerant, such as ammonia, which includes a condenser tank 51 and a compressor 52 driven by a motor 53. The tank 51 and compressor 52 may be hooked up to the unit, or coils 32 and to the coil 48 in any suitable manner as for instance by a feed line 54 from the bottom of the tank 51 to a header 55 to which header the intake end 33 of unit or coils 32 is connected by a line 56 extending to one end of the coil 48. The discharge end of the coils 32, 48 may be connected in a common return line 57 to the compressor 52. A line 58 suitably connects the compressor 52 to said tank 51. A suitable control valve 59 in the header 55 is provided. Access to the described part of the plant may be had by a door 60 in the rear of said cabinet section 2.

A suitable drain pipe 61 common to the ledge 15 and compartments 19, 20 may be provided as shown by dotted line in Figure 1.

It will now be seen that I have devised a beer cooling apparatus adapted for a high degree of efficiency, compactness in arrangement, convenience and which is sanitary. Among the many other advantages of the invention it is desired to particularly emphasize the following.

The close proximity of the kegs 30 to the shells 30 obtained reduces air space to be cooled and provides for rapid transference of temperature to the kegs without necessitating forced circulation around the legs as by fans and or brine as required in coolers of commerce. This results in economy in operation and reducing cost of manufacture.

Having the coils 32 located back of the steel shells 21, instead of in front, obviates damage to the coils in loading and unloading the cooling compartments 19, 20, thereby adding to the life of the cooler. Also this arrangement protects the coils against accumulation of dirt or other substances thereon.

By binding the coils 32 to the shell 21 direct contact is made resulting in increased efficiency in temperature transfer, the shell 21 and coils 32 becoming an integral structure.

By sealing the space between the coils 32 with asphalt, the coils, shells and asphalt become a solid entity forming a highly efficient conductor of temperature and by backing this structure with the cork insulation even temperature distribution is obtained.

The space between the shells 21 and the exterior of the cooler being sealed air tight and moisture proof no frosting can occur except on the inner face of the shells 2.

The composite structure formed by the shells 21, coils 32 and asphalt 37 acts to store the cold temperature so that a similar temperature will be maintained in the compartments 19, 20 for a substantial period of time after the plant has been shut off thereby preventing sudden or rapid fluctuations in temperature in the compartments 19, 20.

The described glass cooling tank will maintain the glasses at the same temperature as that of the beer so that the beer may always be served at the proper temperature.

The foregoing will, it is believed, suffice to impart a clear understanding of my invention without further explanation.

Manifestly the invention, as described, is susceptible of modification without departing from the inventive concept and right is herein reserved to such modifications as fall within the scope of the subjoined claims.

What I claim is:

1. In apparatus of the class described, a cooling cabinet for kegs of beer comprising an elongated rectangular casing for installation lengthwise on a floor or the like, and having a pair of doorways in the rear side thereof upon opposite sides of the transverse center of the casing, a pair of metallic shells in said casing upon opposite sides of said transverse center of U-shape in cross section fitted endwise therein between the top and bottom of said casing in laterally spaced relation to each other and to the front and ends of said casing and forming together with said top and bottom a pair of compartments opening onto said doorways, respectively, each for housing a keg of beer, doors for said doorways, a cooling plant comprising a coil unit of spaced horizontally disposed stretches shaped in conformity with said shells to fit around the outer surfaces thereof and bonded thereto into intimate engagement therewith, and insulation interposed between said unit and the ends and front of said casing.

2. In apparatus of the class described, a cooling cabinet for kegs of beer comprising an elongated rectangular casing for installation lengthwise on a floor or the like, and having a pair of doorways in the rear side thereof upon opposite sides of the transverse center of the casing, a pair of metallic shells in said casing upon opposite sides of said transverse center of U-shape in cross section fitted endwise therein between the top and bottom of said casing in laterally spaced relation to each other and to the front and ends of the casing and forming together with said top and bottom a pair of compartments opening onto said doorways, respectively, each for housing a keg of beer, doors for said doorways, a cooling plant comprising a coil unit of spaced horizontally disposed stretches shaped in conformity with said shells to fit around the outer surfaces thereof and bonded thereto into intimate engagement therewith, a layer-like wall of insulation separating said unit from the front and ends of the casing and comprising cork blocks bonded together in sealed relation, and a filler of cementitious insulation between said wall and the front and ends of said casing.

3. In apparatus of the class described, a cooling cabinet for kegs of beer comprising an elongated rectangular casing for installation lengthwise on a floor or the like, and having a pair of doorways in the rear side thereof upon opposite sides of the transverse center of the casing, a pair of metallic shells in said casing upon opposite sides of said transverse center of U-shape in cross section fitted endwise therein between the top and bottom of said casing in laterally spaced relation to each other and to the front and ends of the casing and forming together with said top and bottom a pair of compartments opening into said doorways, respectively, each for housing a keg of beer, doors for said doorways, a cooling plant comprising a coil unit of spaced horizontally disposed stretches shaped in conformity with said shells to fit around the outer surfaces thereof and bonded thereto into intimate engagement therewith, a layer-like wall of insulation separating said unit from the front and ends of said casing and comprising cork blocks bonded together in sealed relation, a filler of cementitious insulation between said wall and the front and ends of said casing, and a layer of asphalt interposed between said wall and unit and filling the space between the stretches of the latter.

4. In apparatus of the class described, a cooling cabinet for kegs of beer comprising an elongated rectangular casing for installation lengthwise on a floor or the like, and having a pair of doorways in the rear side thereof upon opposite sides of the transverse center of the casing, a pair of metallic shells in said casing upon opposite sides of said transverse center of U-shape in cross section fitted endwise therein between the top and bottom of said casing in laterally spaced relation to each other and to the front and ends of said casing and forming together with said top and bottom a pair of compartments opening onto said doorways, respectively, each for housing a keg of beer, doors for said doorways, a cooling plant comprising a coil unit of spaced horizontally disposed stretches shaped in conformity with said shells to fit around the outer surfaces thereof and bonded thereto into intimate engagement therewith, and insulation interposed between said unit and the ends and front of said casing, a raised closed bar surmounting the top of said casing and extending along the front half thereof, and bushings extending downwardly from said bar into said compartments for the extension of tap rods from said casing upwardly through said bar.

RAY C. AYERS.